United States Patent
Subbaian et al.

(10) Patent No.: US 10,079,960 B1
(45) Date of Patent: Sep. 18, 2018

(54) SYSTEM AND METHOD FOR HALFTONING IN A PRINT SYSTEM

(71) Applicant: Xerox Corporation, Norwalk, CT (US)

(72) Inventors: Sudhagar Subbaian, Coimbatore (IN); Sainarayanan Gopalakrishnan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/496,054

(22) Filed: Apr. 25, 2017

(51) Int. Cl.
*H04N 1/405* (2006.01)
*H04N 1/52* (2006.01)
*G06K 15/02* (2006.01)

(52) U.S. Cl.
CPC .............. *H04N 1/405* (2013.01); *G06K 15/02* (2013.01); *H04N 1/52* (2013.01); *H04N 2201/0094* (2013.01)

(58) Field of Classification Search
CPC .. H04N 1/405; H04N 1/52; H04N 2201/0094; G06K 15/02
See application file for complete search history.

(56) References Cited

U.S. PATENT DOCUMENTS 7,079,290 B2 7/2006 Crossland et al.

*Primary Examiner* — Christopher D Wait
(74) *Attorney, Agent, or Firm* — Fox Rothschild LLP

(57) ABSTRACT

A print system may include a print engine, a processing device and programming instructions to halftone an electronic document to be printed. The system may receive an input image representing the electronic document to be printed, use a first and second threshold array, which are flipped to each other, to halftone the input image to generate a first and second set of data, respectively, then combine the first and second set of data to generate a halftoned image. In combining the first and second set of data, each dot in the halftoned image may represent full saturation if the corresponding dot in at least one of the first and second set of data represents full saturation, or white if the corresponding dots in both the first and second set of data are white. The system may use the same halftoning method for a monochrome or color document.

20 Claims, 6 Drawing Sheets

SYSTEM AND METHOD FOR HALFTONING IN A PRINT SYSTEM

BACKGROUND

This disclosure relates to print systems and in particular to halftoning gray scale and color documents.

Print systems having halftoning capabilities often suffer poor quality in low contrast areas due to dot loss. For example, thin lines which have different gray level (other than pure black) may vanish in a printed document due to dot lost. Other systems designed to improve halftoning densities may suffer from over darkness in high contrast areas.

This document describes systems and methods that are intended to address at least some issues discussed above and/or other issues.

SUMMARY

In some embodiments, a print system includes a print engine, a processing device; and a non-transitory, computer-readable storage medium containing programming instructions. The programming instructions may be configured to cause the processing device to (i) receive an input image representing an electronic document to be printed, (ii) use a first threshold array to halftone the input image to generate a first set of data comprising a plurality of dots, (iii) use a second threshold array to halftone the input image to generate a second set of data comprising a plurality of dots, wherein the second threshold array is a flip of the first threshold array, (iv) combine the first set of data and the second set of data to generate a halftoned image comprising a plurality of dots, and (v) cause the print engine to print the halftoned image. In combining the first and second set of data to generate the halftoned image, in some embodiments, each dot in the halftoned image represents a value of full saturation or white, where the value of each dot in the halftoned image is of full saturation if the corresponding dot in at least one of the first and second set of data represents full saturation, and the value of each dot in the halftoned image is white if the corresponding dots in both the first and second set of data are white.

In some embodiments, the second threshold array is a horizontal or vertical flip of the first threshold array. In either horizontal or vertical flip, the system may not need to consume extra memory space. In some embodiments, the first threshold array is stored in a memory block in a sequence. In flipping horizontally, the system may read data from the memory block to the second threshold array in an alternating sequence so that each element of the second threshold array T2(x,y) takes a value of a corresponding element in the first threshold array T1(x, y0-y) in the memory block, wherein (x, y) is index to each of the first or second threshold array and y0 is a width of the first and second threshold array. Similarly, in flipping vertically, the system may read data from the memory block that contains the first threshold array to the second threshold array in an alternating sequence so that each element of the second threshold array T2(x,y) takes a value of a corresponding element in the first threshold array T1(x0-x, y) in the memory block, wherein (x, y) is index to each of the first or second threshold array and x0 is a height of the first and second threshold array.

The illustrated embodiments can be applicable to either monochrome document or color document. In some embodiments, the electronic document to be printed is a monochrome document, and the full saturation for each dot may be black, producing a binary halftoned image. In some embodiments, the full saturation in the halftoned image may be of an intermediate value, producing a gray scale halftoned image. In some embodiments, the electronic document to be printed is a color document, and the system may repeat steps (ii)-(v) for each individual color channel of the color document, where the input image in step (ii) represents the individual channel of the electronic document. In some embodiments, each individual color channel of the electronic document may be a red, green or blue channel for RGB printing. Each individual color channel may also be cyan, magenta, yellow or black channel for CMYK printing.

Various methods may be implemented in the above illustrated print system. In some embodiments, a method for printing a halftoned image in a print system may include, by a processing device of the print system, (i) receiving an input image representing an electronic document to be printed; (ii) using a first threshold array to halftone the input image to generate a first set of data comprising a plurality of dots; (iii) using a second threshold array to halftone the input image to generate a second set of data comprising a plurality of dots, wherein the second threshold array is a flip of the first threshold array; (iv) combining the first set of data and the second set of data to generate a halftoned image; and (v) causing a print engine of the print system to print the halftoned image. In some embodiments, each dot in the halftoned image represents a value of full saturation or white, where the value of each dot in the halftoned image is of full saturation if the corresponding dot in at least one of the first and second set of data represents full saturation, and the value of each dot in the halftoned image is white if the corresponding dots in both the first and second set of data are white. The method may also have similar features as described in the print system above and may be applicable to monochrome or color document.

In some embodiments, a method for generating a binary halftoned image may include, by a processing device, receiving an input image representing an electronic document to be printed; using a first threshold array to halftone the input image to generate a first set of data comprising a plurality of dots; using a second threshold array to halftone the input image to generate a second set of data comprising a plurality of dots, wherein the second threshold array is a flip of the first threshold array; and combining the first set of data and the second set of data to generate a halftoned image. In some embodiments, each dot in the halftoned image represents a value of black or white, where the value of each dot in the halftoned image is black if the corresponding dot in at least one of the first and second set of data is black, and the value of each dot in the halftoned image is white if the corresponding dots in both the first and second set of data are white.

DETAILED DESCRIPTION

This disclosure is not limited to the particular systems, methodologies or protocols described, as these may vary. The terminology used in this description is for describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "storage medium" each refer to a non-transitory device on which computer-readable data, programming instructions or both are stored. Unless the context specifically states that a single device is required or that multiple devices are required, the terms "memory," "computer-readable medium" and "storage medium" include both the singular and plural embodiments, as well as portions of such devices such as memory sectors.

The term "threshold array" refers to an array of elements or pels, each element or pel representing a threshold value.

The term "halftoning" or "halftone" refers to a technique that uses dots to generate a gradient-look effect to simulate a continuous tone image. The dots may be of different sizes. The halftoning process applies a threshold array to an image to generate a halftoned image by comparing each input image pixel with the corresponding threshold value in the threshold array. For example, in binary halftoning, when the value of each input image pixel is greater (or smaller) than or equal to the corresponding threshold value, the process will generate a fully saturated value (e.g. an active pixel, or black dot is printed) for the corresponding output element (or pel), otherwise the process will generate a white output (e.g. no dot is printed). For an input image, the rows of a given threshold array are cycled through repetitively. For example, the first row in the threshold array is compared to the first row in the input image; the second row in the threshold array is compared to the second row in the image. After the last row in the threshold array is used, the first row of the threshold array will be used again. In non-binary halftoning, the input image pixel may be of gray scale, and the output value for halftoned image may have an intermediate value between black and white.

Figure 1:
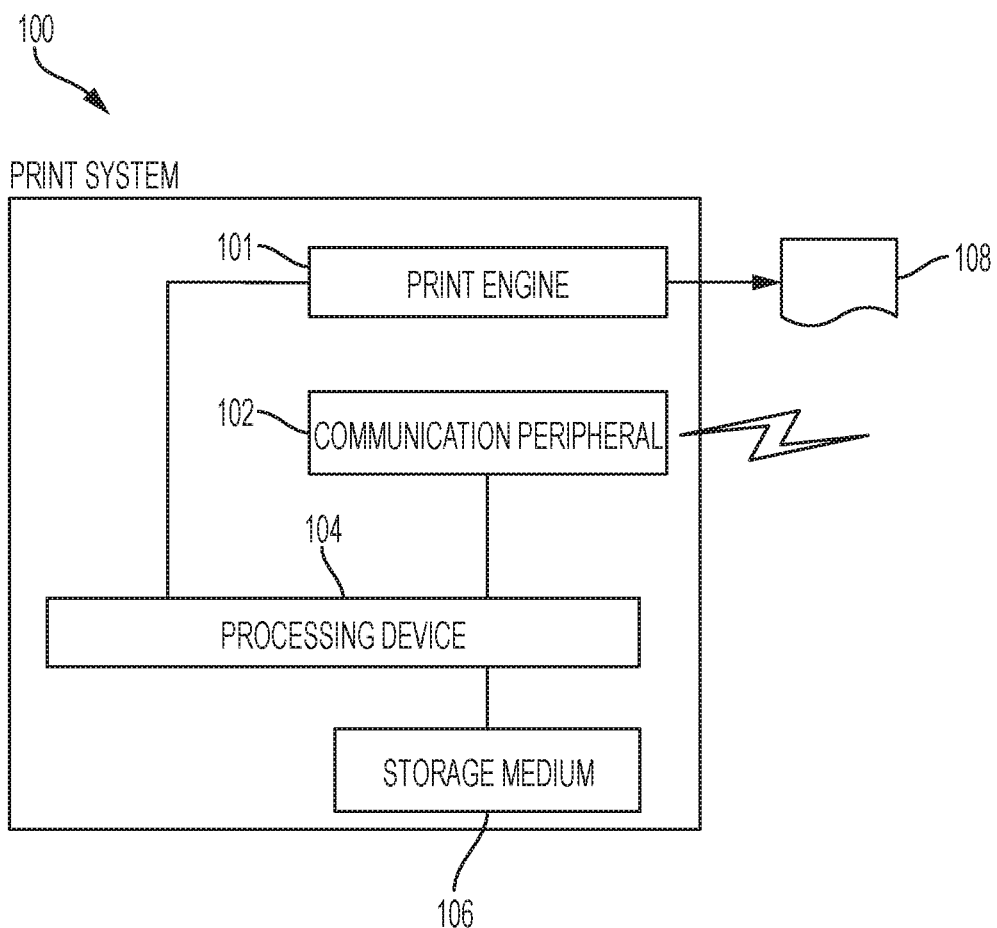
FIG. 1 depicts a print system according to some embodiments.

In FIG. 1, in some embodiments, a print system 100 includes a print engine 101 configured to print an electronic document. The print engine 101 may be a laser engine or an ink jet engine, and is capable of printing a halftoned image. The print system 100 may also include a communication peripheral 102 configured to receive from a user device an electronic document to be printed, and/or to transmit data to the user device. The transmitted data may include the status of a print job or the status of the print system 100.

The print system 100 may also include a processing device 104. The print system 100 may also include a non-transitory computer-readable storage medium 106 such as a RAM or ROM or flash memory. The storage medium 106 may contain programming instructions configured to cause the processing device 104 to perform various print related functions, such as printing and halftoning an image of an electronic document to be printed. In some embodiments, the print system 100 can be configured to receive from a user device an electronic document to be printed, apply a halftoning process to an input image representing the electronic document to be printed to generate a halftoned image, and print the halftoned image with the print engine 101 to produce a printed document 108.

In some embodiments, the communication peripheral 102 may be wired, such as via a USB interface, a parallel or serial port, or an Ethernet port. The communication peripheral 102 may also be wireless, configured to communicate with proximate devices via protocols such as via Wi-Fi, Bluetooth, near-field communication (NFC), infrared or other wireless communication protocols known or later developed. The communication peripheral 102 may be configured to communicate with a user device, a server or the cloud to receive user instructions, receive one or more electronic documents to be printed or other user information related to a print job. Alternatively, and/or additionally, the communication peripheral 102 may be configured to transmit data to a user device, a server or the cloud. For example, the communication peripheral 102 may be configured to transmit the status of a print job, the status of the print system 100 or any data generated by the print system 100, such as error or warning codes. In some embodiments, the print system 100 may also include a multi-function peripheral (MFP), which may additionally include a scanner, a fax, a web browser or other communication devices.

In some embodiments, the storage medium 106 may also contain one or more threshold arrays for halftoning an image. The threshold array may be a one- or two-dimensional array of elements or pels, each representing a threshold value. The threshold array may be pre-stored in the storage medium of the print system. The threshold array may also be received from the user via the communication peripheral 102 along with each print job. The threshold array may also be retrieved via the communication peripheral 102 from a remote server or a cloud.

Figure 2:
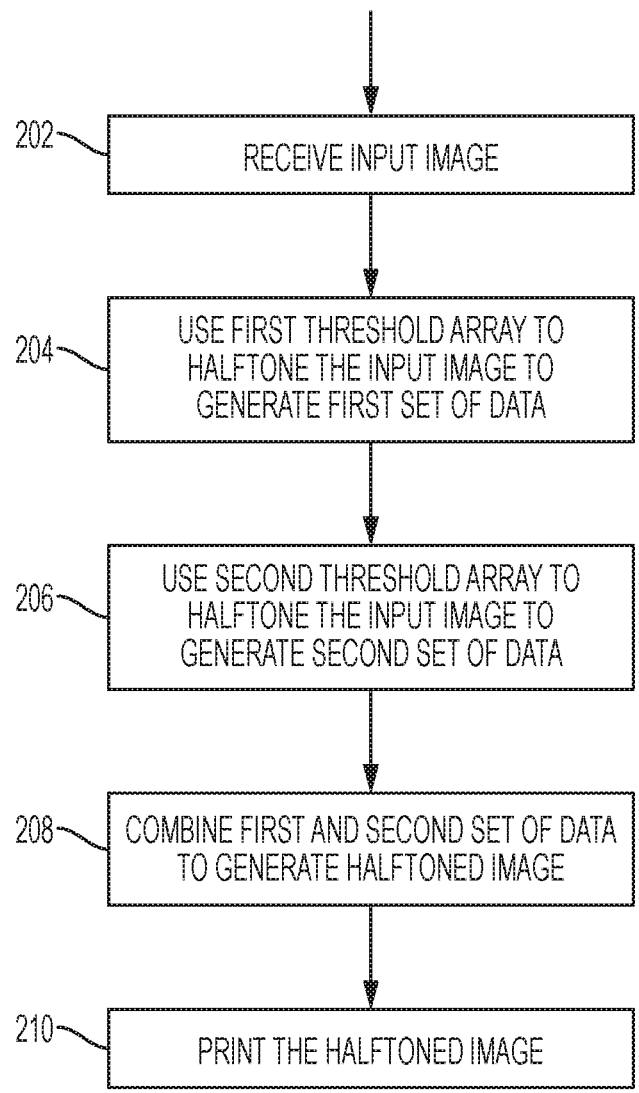
FIG. 2 depicts a diagram of a process of halftoning in a print system according to various embodiments.

With reference to FIG. 2, in some embodiments, the computer-readable storage medium of the print system may contain programming instructions that are configured to cause the processing device to receive an input image representing an electronic document to be printed 202. The processing device may further use a first threshold array to halftone the input image to generate a first set of data that includes a plurality of dots 204, and use a second threshold array to halftone the input image to generate a second set of data that includes a plurality of dots 206. The processing device may further combine the first set of data and the second set of data to generate a halftoned image that also includes a plurality of dots 208, and cause the print engine to print the halftoned image 210.

In some embodiments, each pixel in the halftoned image represents a value of full saturation (active, i.e. a dot will be printed) or white (inactive, i.e. no dot will be printed). In some embodiments, the value of full saturation (active) and white (inactive) may be of any value. For example, the value of full saturation may be one, the value of inactive may be zero; or vice versa. In combining the first and second set of data, in some embodiments, the value of each pixel in the halftoned image may be of full saturation (active) if the corresponding dot in at least one of the first and second set of data is active, and the value of each pixel may be white (inactive) if the corresponding dots in both the first and second set of data are white. This can be expressed in a Boolean OR (when the value one represents active pixel, and value zero represents inactive pixel). The combination can also be expressed in a Boolean AND, when the value one represents inactive pixel and value zero represents active pixel. The above illustrated embodiments can be applicable to both binary halftoning, gray scale halftoning or color halftoning.

In some embodiments, in binary halftoning, the value of each dot in the halftoned image may be black if the corresponding dot in at least one of the first and second set of data is black, and the value of each dot in the halftoned image may be white if the corresponding dots in both the first and second set of data are white. In some embodiments, in color halftoning, each color channel in the color document can be treated as a binary image and halftoned in the same manner as in the binary halftoning. This can be repeated for all of the channels in color printing, such as RGB, CMYK or iGen digital press printing.

In some embodiments, the second threshold array is a flip of the first threshold array. The second threshold array may be a horizontal flip or a vertical flip of the first threshold array. The flip of the threshold array may not require additional memory from the system. In some embodiments, the first threshold array, $T1(x,y)$, may be stored in a memory block in a sequence, e.g. in a row-wise fashion. In a horizontal flip, the system may read the data in the memory block to the second threshold array $T2(x,y)$ in an alternating sequence without pre-storing the second threshold array or performing the flipping operation separately. For example, the system may read the data in the memory block in which the first threshold array $T1(x,y)$ is stored to the second threshold array $T2(x,y)$ in a sequence so that each element in the second threshold array $T2(x,y)$ takes a value of $T1(x, y0-y)$ in the memory block, where $(x, y)$ is the index to each of the first or second threshold array and $y0$ is the width of the first and second threshold array. Alternatively, and/or additionally, in a vertical flip, the system may read the data in the memory block in which the first threshold array $T1(x,y)$ is stored to the second threshold array $T2(x,y)$ in a sequence so that each element in the second threshold array $T2(x,y)$ takes the value of $T1(x0-x, y)$ in the memory block, where $(x, y)$ is the index to each of the first or second threshold array and $y0$ is the height of the first and second threshold array.

Figure 3:
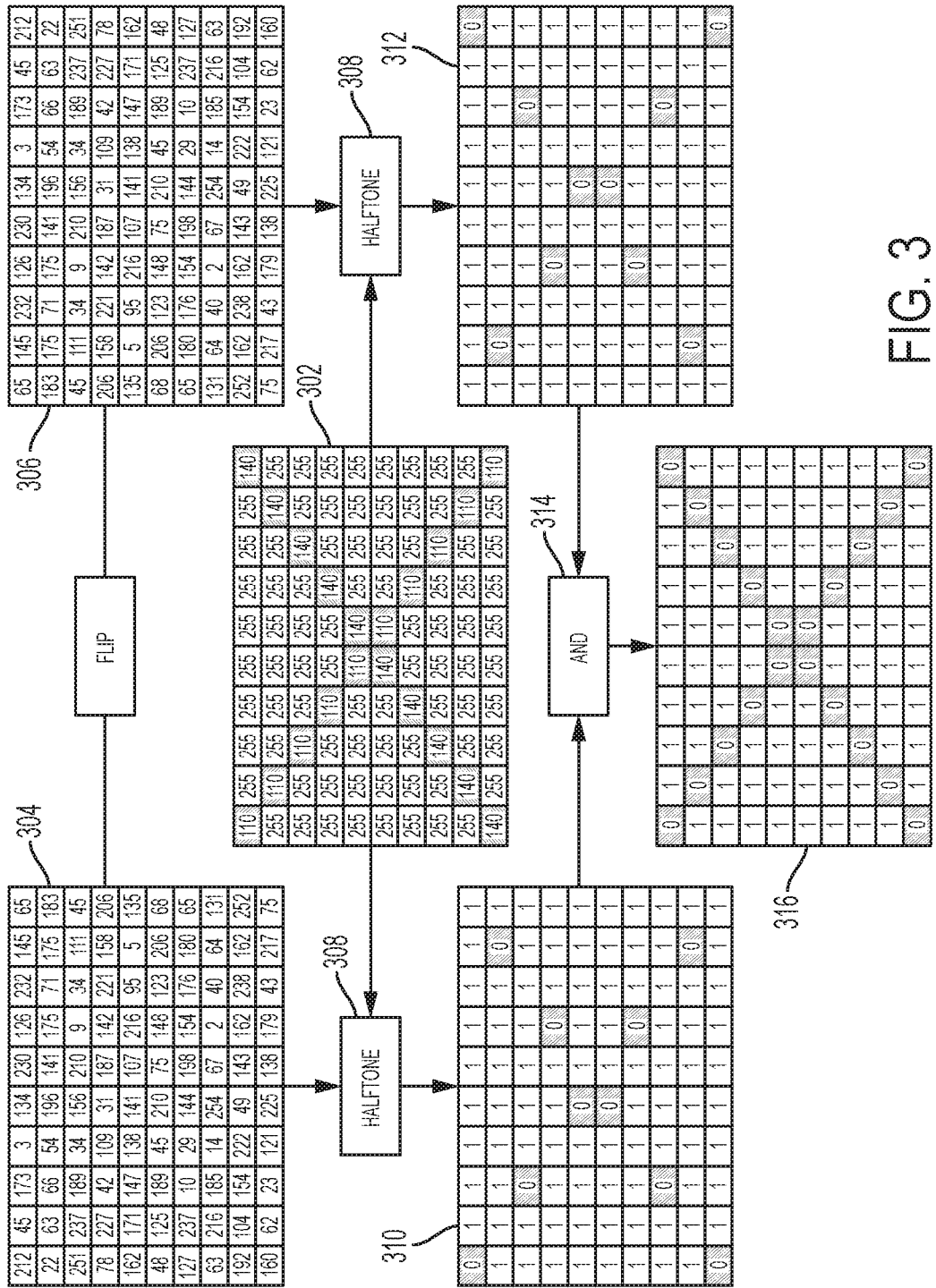
FIG. 3 depicts a halftoning process using an example of a threshold array according to various embodiments.

FIG. 3 shows a halftoning process using an example of a threshold array according to various embodiments. In FIG. 3, a method may include halftoning 308 an input contone image 302 with a first threshold array 304 and a second threshold array 306. As shown, the second threshold array 306 is a horizontal flip of the first threshold array 304. The first and second threshold array may each include an array of elements or pels, each element or pel having a threshold value. As shown in FIG. 3, in a binary halftoning 308, if the input intensity in the input image is smaller than or equal to the threshold value, a fully saturated (active, represented by value zero) corresponding output pel is generated, otherwise the corresponding output pel is white (inactive, represented by value one). In some embodiments, the fully saturated output may be black for binary halftoning. In some embodiments, the fully saturated output may be the color of any individual color channel for color printing. For example, the fully saturated output may be blue, red or green for RGB printing, or may be cyan, magenta, yellow or black in CMYK printing. Generally, the size of the input image is much larger than the size of the threshold array. For each line in the input image, a given threshold array row is used for comparison. The next threshold array row is then used for the next line in the input image. After the last row in the threshold array is used, the threshold array rows are cycled through, the top row of the threshold array is used again. Each halftoning process produces an intermediate output 310, 312, each including a plurality of dots, and each representing a fully saturated color (active) or white (inactive).

In FIG. 3, the halftoning method may further combine the intermediate output 310, 312 by a Boolean AND operation 314 and produce a halftoned image 316, which also include a plurality of dots, each representing full saturated value or white (value of zero or one). By AND operation 314, the value of each dot in the halftoned image is black (i.e. zero) if the corresponding dot in at least one of the first 310 and second 312 set of data is black. The value of each dot in the halftoned image is white if the corresponding dots in both the first and second set of data are white. Similarly, when the value of zero and one are reversed for active and inactive pixels, the system may use Boolean OR operation in combining the first and second set of data.

Figure 4A:
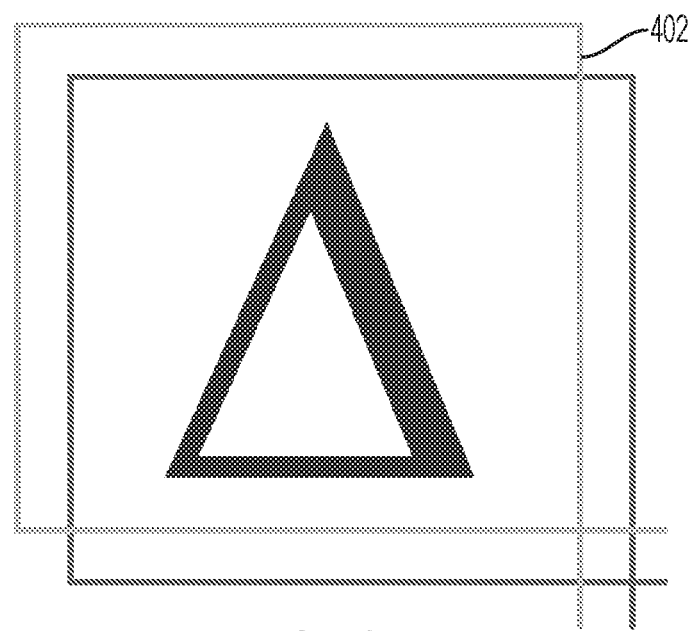
FIGS. 4A-4D depict an example of halftoning according to the illustrated embodiments.
Figure 4B:
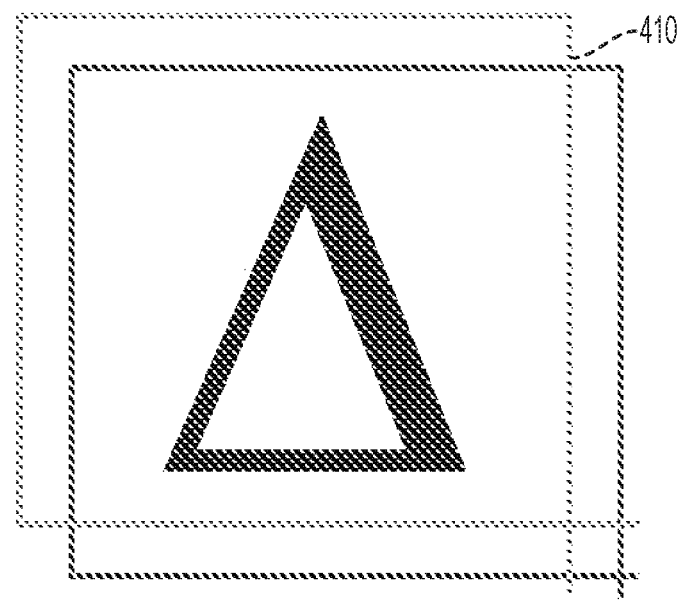
Figure 4C:
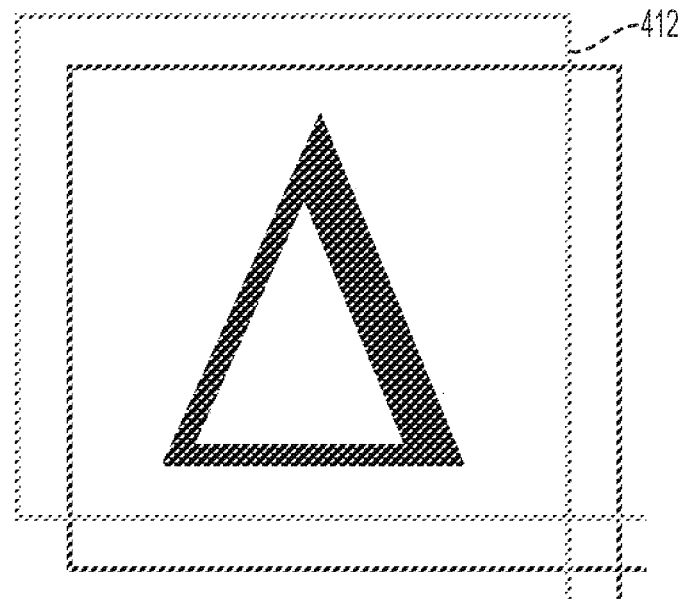
Figure 4D:
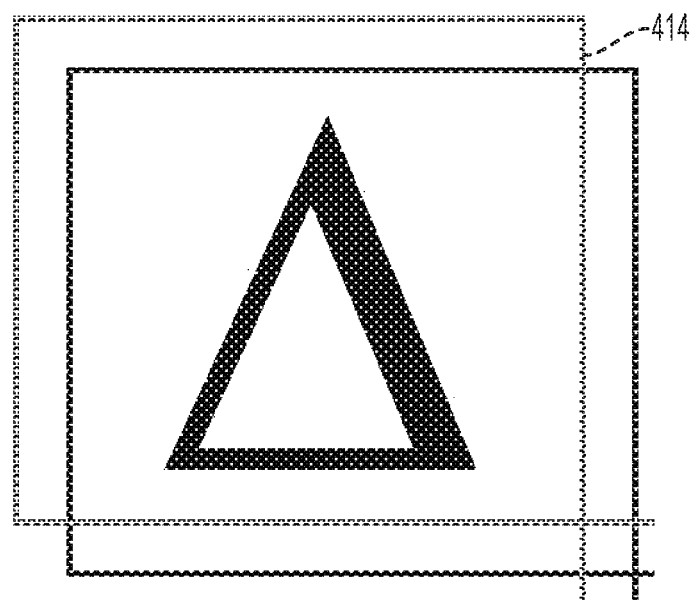

FIGS. 4A-4D show another example of halftoning according to some illustrated embodiments. FIG. 4A shows a contone image that has continuous tone, each pixel in the contone image closely represents a greyscale value of an input image. FIG. 4B shows a halftone image using a first threshold array, and FIG. 4C shows a halftone image using a second threshold array, where the second threshold array is a horizontal flip of the first threshold array. As shown in FIG. 4B, the halftone pattern primarily includes lines oriented at 45 degrees from top left to bottom right. The halftone pattern shown in FIG. 4C primarily includes lines oriented at 45 degrees in a flipped direction, i.e. from lower left to upper right. FIG. 4D shows the combination of FIG. 4B and FIG. 4C according to above illustrated embodiments. As shown, the low contrast border 414 has an improved intensity. In particular, the low contrast line 402 appears light or broken in a single halftoning process in either FIG. 4B (410) or FIG. 4C (412), but the intensity has significantly improved in the resultant combined halftoned image FIG. 4D (414). When comparing FIG. 4D to the original image in FIG. 4A, it can be shown that the intensity of low contrast regions, i.e. the light border 414 is preserved, whereas the intensity of higher contrast region, e.g. the triangle shape, remains about the same. An advantage shown in this example is that the visibility of low intensity regions in the halftoned image (FIG. 4D) is improved in comparison to the result of using a single halftoning process (FIG. 4B or FIG. 4C).

Figure 5:
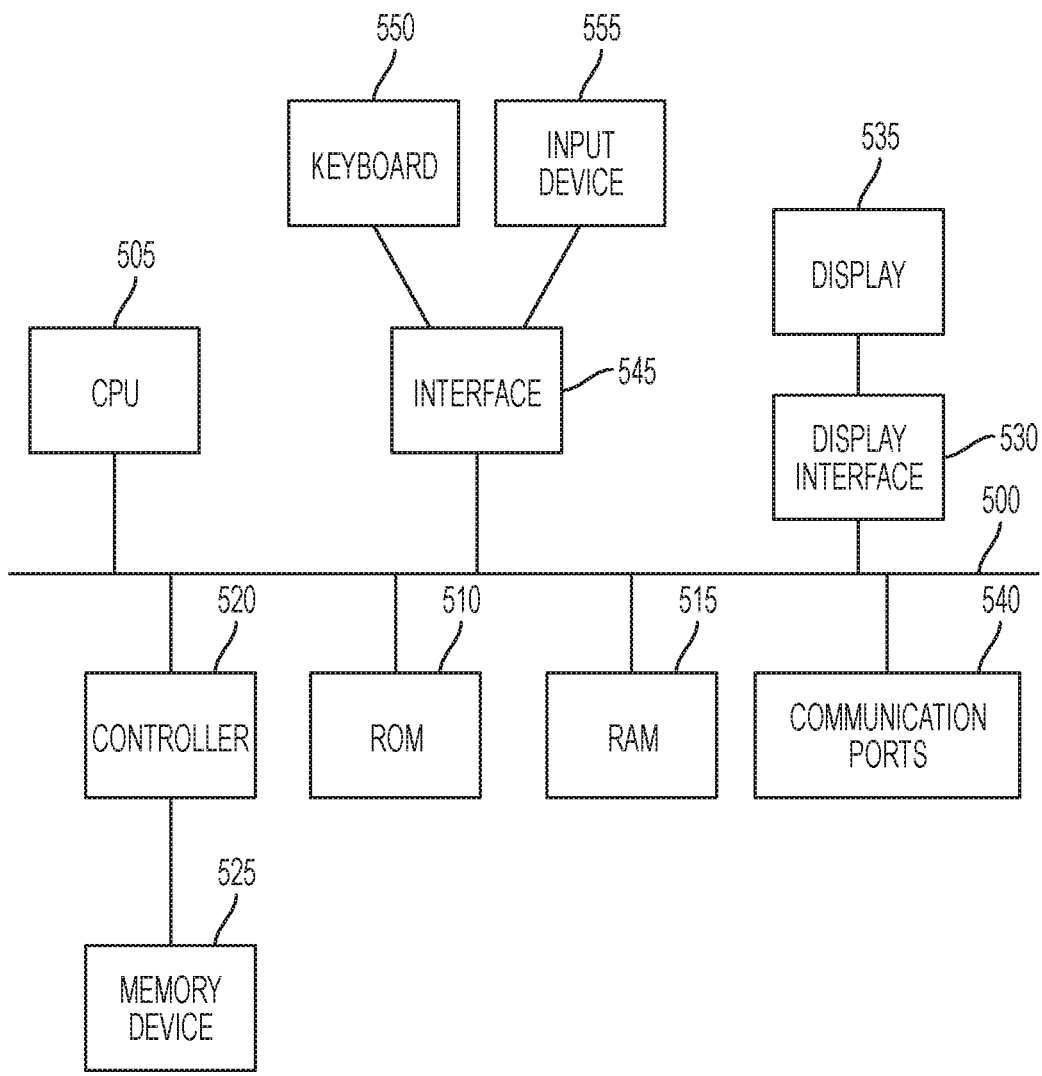
FIG. 5 depicts various embodiments of one or more electronic devices for implementing the various methods and processes described herein.

The above-illustrated embodiments described in FIGS. 2-4 can be implemented in various configurations. For example, the system may implement these functions by a processing device of the print system, a processing device of a remote server or a processing device on a cloud. FIG. 5 depicts an example of internal hardware that may be included in any of the electronic components of the system, such as the processing device. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 525. A memory device, also referred to as a computer-readable medium, may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) can also be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device and/or an audio input device. Digital image frames also may be received from an imaging capturing device 555 such as a camera positioned in a proximity of the print system to capture user interactions.

Optionally, the hardware may not need to include a memory, but instead programming instructions are running on one or more virtual machines or one or more containers on a cloud. For example, the processing device 104 (in FIG. 1) may be a server on a cloud that includes multiple virtual machines, each virtual machine having an OS, a virtual disk, virtual network and Apps, and the programming instructions for implementing various functions in the print system may be stored on one or more of those virtual machines on the cloud.

The illustrated embodiments provide advantages over existing systems having halftoning capabilities. For example, the ratio of intensity in low contrast regions in the document will increase, whereas the ratio of intensity in high contrast regions will be relatively less boosted. This will improve the visibility of low intensity regions in a print system. Further, the illustrated embodiments are simple to implement with low memory requirement, and can be built-in to a print driver of the print system.

The above-disclosed features and functions, as well as alternatives, may be combined, into many other different systems or applications. Various presently unforeseen or unanticipated alternatives, modifications, variations or improvements may be made by those skilled in the art, each of which is also intended to be encompassed by the disclosed embodiments.

The invention claimed is:

1. A print system, comprising:
   a print engine;
   a processing device; and
   a non-transitory, computer-readable storage medium containing programming instructions that are configured to cause the processing device to:
   (i) receive an input image representing an electronic document to be printed,
   (ii) use a first threshold array to halftone the input image to generate a first set of data comprising a plurality of dots,
   (iii) use a second threshold array to halftone the input image to generate a second set of data comprising a plurality of dots, wherein the second threshold array is a flip of the first threshold array,
   (iv) combine the first set of data and the second set of data to generate a halftoned image comprising a plurality of dots, wherein each dot in the halftoned image represents a value of full saturation or white, and wherein:
      the value of each dot in the halftoned image is of full saturation if a corresponding dot in at least one of the first and second set of data represents full saturation, and
      the value of each dot in the halftoned image is white if corresponding dots in both the first and second set of data are white, and
   (v) cause the print engine to print the halftoned image.

2. The print system of claim 1, wherein the second threshold array is a horizontal flip of the first threshold array.

3. The print system of claim 1, wherein the second threshold array is a vertical flip of the first threshold array.

4. The print system of claim 2, wherein:
   the first threshold array is stored in a memory block in a sequence; and
   the programming instructions for using the second threshold array to halftone the input image comprise programming instructions configured to cause the processing device to read data from the memory block to the second threshold array in an alternating sequence so that each element of the second threshold array $T2(x,y)$ takes a value of a corresponding element in the first threshold array $T1(x, y0-y)$ in the memory block, wherein $(x, y)$ is index to each of the first or second threshold array and $y0$ is a width of the first and second threshold array.

5. The print system of claim 3, wherein:
   the first threshold array $T1(x,y)$ is stored in a memory block in a sequence; and
   the programming instructions for using the second threshold array to halftone the input image comprise programming instructions configured to cause the processing device to read data from the memory block to the second threshold array in an alternating sequence so that each element of the second threshold array $T2(x,y)$ takes a value of a corresponding element in the first threshold array $T1(x0-x, y)$ in the memory block, wherein $(x, y)$ is index to each of the first or second threshold array and $x0$ is a height of the first and second threshold array.

6. The print system of claim 1, wherein the electronic document is a monochrome document and the full saturation is black.

7. The print system of claim 1, wherein:
   the electronic document is a color document and the input image is an image representing an individual color channel of the electronic document;
   the programming instructions comprise additional programming instructions configured to cause the processing device to repeat the steps of (ii)-(v) for all of the individual color channels of the electronic document.

8. The print system of claim 7, wherein each individual color channel of the electronic document is a red, green or blue channel.

9. The print system of claim 7, wherein each individual color channel of the electronic document is a cyan, magenta, yellow or black channel.

10. A method for printing a halftoned image in a print system, comprising:
    by a processing device of a print system:

(i) receiving an input image representing an electronic document to be printed;
(ii) using a first threshold array to halftone the input image to generate a first set of data comprising a plurality of dots;
(iii) using a second threshold array to halftone the input image to generate a second set of data comprising a plurality of dots, wherein the second threshold array is a flip of the first threshold array;
(iv) combining the first set of data and the second set of data to generate a halftoned image comprising a plurality of dots, wherein each dot in the halftoned image represents a value of full saturation or white, and wherein:
  the value of each dot in the halftoned image is of full saturation if a corresponding dot in at least one of the first and second set of data represents full saturation, and
  the value of each dot in the halftoned image is white if corresponding dots in both the first and second set of data are white; and
(v) causing a print engine of the print system to print the halftoned image.

11. The method of claim 10, wherein the second threshold array is a horizontal flip of the first threshold array.

12. The method of claim 10, wherein the second threshold array is a vertical flip of the first threshold array.

13. The method of claim 11, wherein:
the first threshold array is stored in a memory block in a sequence; and
using the second threshold array to halftone the input image comprises reading data from the memory block to the second threshold array in an alternating sequence so that each element of the second threshold array T2(x,y) takes a value of a corresponding element in the first threshold array T1(x, y0-y) in the memory block, wherein (x, y) is index to each of the first or second threshold array and y0 is a width of the first and second threshold array.

14. The method of claim 12, wherein:
the first threshold array T1(x,y) is stored in a memory block in a sequence; and
the programming instructions for using the second threshold array to halftone the input image comprise programming instructions configured to cause the processor to read data from the memory block to the second threshold array in an alternating sequence so that each element of the second threshold array T2(x,y) takes a value of a corresponding element in the first threshold array T1(x0-x, y) in the memory block, wherein (x, y) is index to each of the first or second threshold array and x0 is a height of the first and second threshold array.

15. The method of claim 10, wherein the electronic document is a monochrome document and the full saturation is black.

16. The method of claim 10, wherein:
the electronic document is a color document and the input image is an image representing an individual color channel of the electronic document;
the method further comprises repeating the steps of (ii)-(v) for each of the individual color channel.

17. The method of claim 16, wherein each individual color channel of the electronic document is a red, green or blue channel.

18. The method of claim 16, wherein each individual color channel of the electronic document is a cyan, magenta, yellow or black channel.

19. A method for generating a binary halftoned image, comprising:
by a processing device:
receiving an input image representing an electronic document to be printed;
using a first threshold array to halftone the input image to generate a first set of data comprising a plurality of dots;
using a second threshold array to halftone the input image to generate a second set of data comprising a plurality of dots, wherein the second threshold array is a flip of the first threshold array; and
combining the first set of data and the second set of data to generate a halftoned image comprising a plurality of dots, wherein each dot in the halftoned image represents a value of black or white, and wherein:
  the value of each dot in the halftoned image is black if a corresponding dot in at least one of the first and second set of data is black, and
  the value of each dot in the halftoned image is white if corresponding dots in both the first and second set of data are white.

20. The method of claim 19, wherein the second threshold array is a horizontal or vertical flip of the first threshold array.

* * * * *